United States Patent Office 3,538,099
Patented Nov. 3, 1970

3,538,099
8-QUINOLYL- AND 8-QUINALDYL CARBAMATES
Otto Rohr, Neu-Allschwil, Hans-Rudolf Hitz, Muttenz, and Ladislaus Pintér, Basel, Switzerland, assignors to Ciba Limited, Basel, Switzerland, a company of Switzerland
No Drawing. Continuation of application Ser. No. 550,170, May 16, 1966. This application Jan. 31, 1969, Ser. No. 798,251
Claims priority, application Switzerland, May 17, 1965, 6,838/65
Int. Cl. C07d *33/50*
U.S. Cl. 260—287                                    8 Claims

ABSTRACT OF THE DISCLOSURE

New pesticidal preparations are provided which contain as the active ingredient the compound of the formula

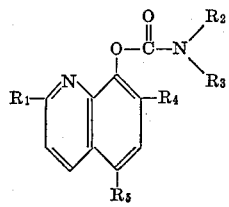

wherein $R_1$ represents hydrogen or methyl, $R_2$ represents hydrogen or lower alkyl containing 1 to 4 carbon atoms, $R_3$ represents lower alkyl containing 1 to 4 carbon atoms, chloroalkyl containing 1 to 4 carbon atoms or phenyl or phenyl substituted by —$NO_2$, halogen, —$CF_3$ or lower alkyl containing 1 to 4 carbon atoms, and $R_4$ and $R_5$ each represents hydrogen or halogen, or the salts of these compounds with acids. The new preparations contain one or more of the following additives: solvents, diluents, dispersants, wetting agents, adhesives and other pesticides.

The pesticidal preparations of this invention are especially effective against microorganisms, protozoa and harmful insects, acarides, nematodes, crabs and molluscs.

---

This application is a continuation of copending application Ser. No. 550,170, filed May 16, 1966, now abandoned.

The present invention provides a preparation for combating pests, especially micro-organisms, protozoa and harmful insects, acarides, nematodes, crabs and molluscs, which comprises, as active ingredient a compound of the general formula

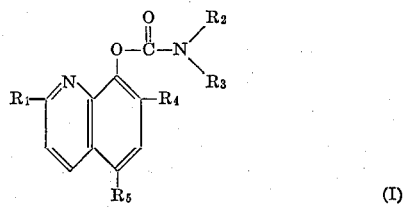
(I)

wherein $R_1$ represents a hydrogen atom or a methyl radical, $R_2$ represents a hydrogen atom or a lower alkyl radical containing 1 to 4 carbon atoms, $R_3$ represents a lower alkyl radical containing 1 to 4 carbon atoms, a chloroalkyl radical containing 1 to 4 carbon atoms or an unsubstituted phenyl radical or a phenyl radical substituted by —$NO_2$, halogen (preferably chlorine), —$CF_3$ or a lower alkyl radical containing 1 to 4 carbon atoms, and $R_4$ and $R_5$ each represents a hydrogen atom or a halogen atom, or the salts of these compounds with acids. The new preparations may further contain one or more of the following additives: a solvent, a diluent, a dispersant, a wetting agent, an adhesive and other pesticides.

The present invention is especially concerned with preparations of the kind defined above for combating microorganisms, comprising as active ingredient, a compound of the general formula

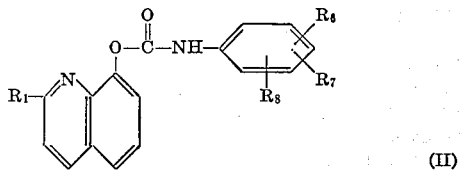
(II)

wherein $R_1$ represents a hydrogen atom or a methyl group, $R_6$ represents an alkyl radical containing 1 to 4 carbon atoms, the group —$NO_2$, —$CF_3$ or a halogen atom, preferably chlorine, $R_7$ represents a hydrogen atom, an alkyl radical containing 1 to 4 carbon atoms or a halogen atom, and $R_8$ stands for a hydrogen atom or a halogen atom, preferably chlorine, or a salt of this compound with an acid.

The compounds of the general Formula I are accessible by known methods; for example by reacting a compound of the general formula

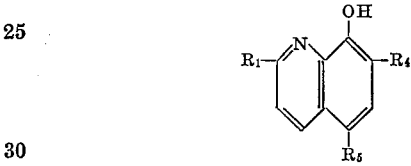

wherein $R_1$, $R_4$ and $R_5$ have the same meanings as in the general Formula I with an arylisocyanate of the general formula

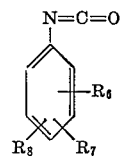

wherein $R_6$, $R_7$ and $R_8$ have the same meanings as in the above general Formula II or with an alkylisocyanate of the general formula

wherein R represents a lower alkyl radical containing 1 to 4 carbon atoms or a chloroalkyl radical containing 1 to 4 carbon atoms, in the presence of an inert organic solvent, for example, ether, dioxane or benzene.

The compounds of the general Formula I may be used in general pest control, in plant protection and in hygiene. In this connection it is especially advantageous that the new compounds, for example when used in plant protection, display no toxic side-effects towards the host organism when used in the concentrations required for an antiparasitary effect. The new compounds can be widely used in pest control, for example also in timber protection, for preserving a wide variety of technical products, for protecting fibrous materials from harmful microorganisms, for preserving agricultural produce, as disinfectants, in veterinary medicine and in body hygiene.

In this connection, it is of special importance that the compounds of this invention do not lose their bactericidal and fungicidal activity even in the presence of protein substances or soaps. The new compounds have no offensive odors of their own and are readily tolerated by the skin, at least by healthy skin.

As examples of the use of the new compounds in plant protection, there may be mentioned the treatment of plant seeds and of wholly or only partially developed plants, as well as the soil in which the plants grow, to protect them from harmful organisms, especially harmful fungi, fungus spores and bacteria.

As examples of technical products that can be preserved or disinfested with the aid of the compounds of the general Formula I there may be mentioned: Textile adjuvants and improving agents, glues, binders, paints, thickeners, color and printing pastes and similar preparations based on organic or inorganic dyestuffs or pigments, including those which incorporate casein or other organic compounds. Wall and ceiling paints, for example those which contain a protein dyestuff binder, are likewise protected from attacks by pests by admixture of the new compounds.

Furthermore, the compounds of the general Formula I may be used for protecting fibres and textiles; in this application they display a good effect against harmful organisms, for example fungi and bacteria. The compounds may be added before, together with, or after a treatment of these textiles with other products, for example dyestuff or printing pastes or dressings materials. Textiles treated in this manner are also protected from the occurrence of perspiration odor caused by microorganisms.

The new compounds may also be used as preservatives in the cellulose and paper industries, inter alia for preventing the known sludge formation in the papermaking machines due to microorganisms.

As further pesticides that may be used in combination with the active substances of the general Formula I, there may be mentioned further fungicides, bactericides, acaricides, insecticides and fertilizers.

Depending on the type of additive used in combination with the active substances in the preparations of this invention, there are obtained agents suitable for cleansing, disinfecting or body care.

Thus, for example, by combining the compounds of this invention with wash-active or surface-active substances, there are obtained detergents and cleansers having a pronounced antibacterial and/or antimycotic effect. The compounds of the general Formula I may be incorporated, for example, with soaps or combined with soap-free wash-active or surface-active substances, or they may be combined with mixtures of soaps with soap-free, wash-active substances.

As examples of soap-free, wash-active compounds that may be used in admixture with the products to be used in this invention there may be mentioned, for example, alkylarylsulphonates, fatty alcohol sulphates, condensation products from fatty acids and methyltaurine, condensation products from fatty acids with hydroxyethanesulphonates, fatty acid+albumen condensation products, alkylsulphonates, nonionic products, for example condensation products from alkylphenols and ethylene oxides, and cationic compounds. The compounds of the general Formula I may also be incorporated in industrial detergents, for instance together with a condensed phosphate, for example 20 to 50% of alkali metal tripolyphosphate. They may also be used in the presence of an organic lyophilic polymeric substance capable of increasing the dirt-carrying capacity of the wash liquor, for example an alkali metal salt of carboxymethyl cellulose (cellulose glycollic acid).

The antibacterial or antimycotic activity of the compounds of the general Formula I is not only not impaired by the addition of cleansing agents, for example anionic, cationic or nonionic products, but in fact, in many cases such a combination produces an unexpected synergism of their action.

The disinfecting cleansing preparations obtained in this manner may be used, for example, in laundry work. In this connection it is advantageous that the new active substances, when used in an appropriate concentration, deposit from the wash liquor on the fibrous material and impart to it a durable antibacterial and antimycotic finish.

Preparations of this invention containing compounds of the general Formula I may also be used as industrial cleansers or as domestic cleansers, and also in the food industry, for example in dairies, breweries and abattoirs.

The new compounds may also be used as ingredients of preparations for cleansers and disinfectants for use in hospitals and in the surgery, for example for washing patients' clothes, wards and apparatus, if required in combination with other disinfectants and antiseptics so that any cleansing or disinfecting job can be carried out satisfactorily. In this connection the fact that the compounds do not lose their effect upon microorganisms in the presence of blood or serum is of special importance.

The new compounds may also be used in preparations intended for cleaning the skin, for example, the hands, with an antibacterial or antimycotic effect, if necessary in combination with other bactericidal or fungicidal substances, skin protecting substances and the like. Furthermore, they prevent efficiently the objectionable body odor caused by microorganisms. In this connection, it is again an advantage that they do not irritate the skin, at least healthy skin, and that they have no objectionable odor of their own as is the case, for example, with the chlorinated phenols.

As additives having a microbicidal effect, which may be present in the preparations of this invention apart from compounds of the general Formula I, there may be mentioned, for example: 3,4-dichlorobenzyl alcohol, ammonium compounds, for example, diisobutylphenoxyethoxyethyl dimethyl benzyl ammonium chloride, cetyl pyridinium chloride, cetyl trimethyl ammonium bromide, halogenated dihydroxydiphenylmethanes, tetramethyl thiuram disulphide, 2,2'-thio-bis-(4,6-dichlorophenol); also organic compounds containing the thio-trichloromethyl group, as disclosed in U.S. Pats. Nos. 2,553,772, 2,553,770, 2,553,775, 2,553,773, 2,553,774, 2,553,777 and 2,553,778; 2-nitro-2-furfuryl iodide (cf. Austrian specification No. 210,411), salicylanilides, dichlorosalicylanilides, dibromosalicylanilides, tribromosalicylanilides, dichlorocyanuric acid, tetrachlorosalicylanilides, aliphatic thiuram sulphides, hexachlorophen (2,2' - dihydroxy - 3,5,6,3',5',6'-hexachlorodiphenylmethane).

Preparations of this invention having a disinfecting effect may further contain antioxidants, light filters, optical brighteners, dehardeners or aromas.

In keeping with their many possible spheres of application, the preparations of this invention containing compounds of the general Formula I may be used in a wide variety of forms, for example they may be soaps in cake form or semisolid or liquid soaps, pastes, powders, emulsions, suspensions, solutions in organic solvents, sprays, granulates, tablets, pencils, capsules from gelatin or other materials, ointments, skin and shaving creams, mouthwashes, liquid, semisolid or solid dentifrices and similar preparations, in hair shampoos and other preparations for the care of hair, and also in the aerosol form.

The activity of the carbamates of this invention towards pests, especially harmful microorganisms, may also be imparted to moldings made from synthetics. When a plasticizer is used, it is advantageous to add the biocidal substance to the synthetic material in the form of a solution or dispersion in the plasticizer, making sure that the additive is distributed as evenly as possible in the synthetic. Synthetics having germicidal properties may be used for the manufacture of particles for daily use that are desired to display a prophylactic activity towards a wide variety of pathogens, for example putrefacients or skin fungi, for example in doormats, handles, fittings on doors, seats, treads in swimming pools, wall coverings and the like. By incorporating the new compounds in suitable waxes and polishing compounds, there are obtained products having a disinfectant effect, suitable for the care of floors and furniture.

Especially efficient substances for combating protozoa, especially *Entamoeba histolytica*, are those compounds which contain as active ingredient the compound of the formula

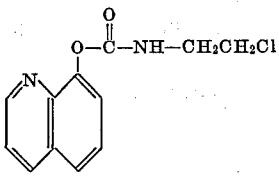

Particularly useful for combating harmful insects, especially Orthoptera, above all cockroaches, house crickets and locusts, and acarides are those preparations which contain as active substance one of the following compounds

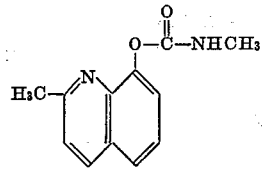

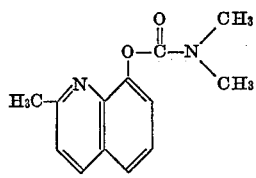

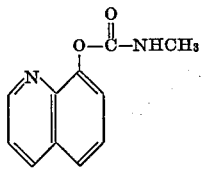

and

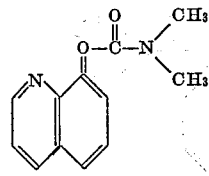

The present invention is further concerned with the new compounds of the general formula

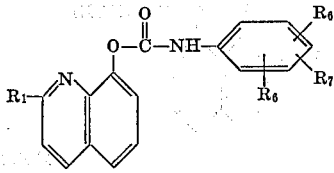

wherein $R_1$ represents a hydrogen atom or a methyl residue, $R_6$ an alkyl radical containing 1 to 4 carbon atoms, the group —$NO_2$, —$CF_3$ or a halogen atom, $R_7$ represents a hydrogen atom, an alkyl radical containing 1 to 4 carbon atoms or a halogen atom, and $R_8$ a hydrogen or halogen atom, or a salt of this compound with an acid, as well as the compound of the formula

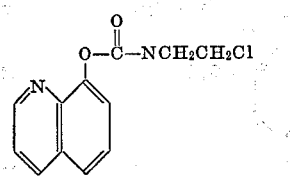

The present invention further relates to compounds of the general Formula I wherein $R_1$ represents a methyl group and the salts, preferably the sulphates and hydrochlorides, of these compounds. The salts, because of their solubility in water, may be used directly in the form of aqueous solutions. A special advantage of the salts, especially of the sulphate and iodate, is their outstanding shelf life and/or their prolonged activity.

The compounds of the general Formula I may also be used as desiccants or defoilants, for example in cotton plants.

The following examples illustrate the invention. Parts and percentages are by weight.

EXAMPLE 1

(1) 29 grams of 8-hydroxyquinoline are dissolved in 100 ml. of ether, then 100 mg. of triethylene-diamine are added, 12.5 g. of methylisocyanate are dropped in and the mixture is stirred for 16 hours. The ether is then distilled off and the residue recrystallized from acetone + benzene. M.P. 162°–163° C.

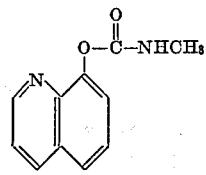

(2) 31.8 grams of 8-hydroxyquinaldine are dissolved in 150 ml. of benzene and 150 mg. of triethylenediamine and then 12.5 g. of methylisocyanate are added. The precipitated reaction product is filtered off after 16 hours' stirring and washed with gasoline and dried. M.P. 130°–132° C.

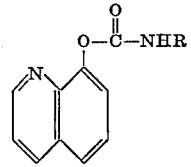

The following compounds may be prepared in a similar manner:

| | R = | M.P. |
|---|---|---|
| (3) | 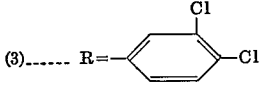 | M.P. 187–189° C. |
| (4) | 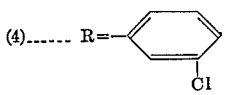 | M.P. 142–144° C. |
| (5) | 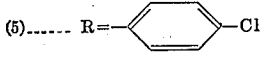 | M.P. 169–171° C. |
| (6) | 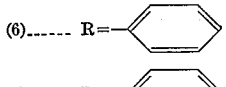 | M.P. 160–163° C. |
| (7) | 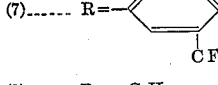 | M.P. 117–119° C. |
| (8) | R = —$C_2H_5$ | M.P. 150–151° C. |
| (9) | R = $CH_2CH_2Cl$ | M.P. 106–108° C. |
| (10) | 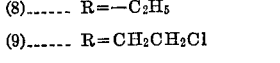 | M.P. 190–193° C. |
| (11) | 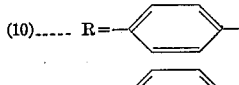 | M.P. 153–154° C. |
| (12) | R = —$C_3H_7$—n | M.P. 96–97° C. |
| (13) |  | M.P. 116–119° C. |
| (14) | 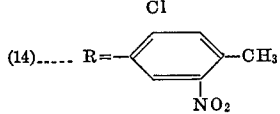 | M.P. 161–165° C. |

| | | |
|---|---|---|
| (15) | R = —⌬—CH₃ | M.P. 130–131° C. |
| (16) | R = —⌬(CH₃)(CH₃) | M.P. 156–158° C. |
| (17) | R = —⌬(Cl)(CF₃) | M.P. 177–179° C. |
| (18) | R = —⌬(Cl)(Cl)(Cl) | M.P. 164–167° C. |

Structure: 8-quinolyl carbamate with 2-methyl substituent:
H₃C—(quinoline)—O—C(=O)—NHR (by reacting 8-hydroxyquinaldine with R—N=C=O)

| | | |
|---|---|---|
| (19) | R = —⌬(Cl)(Cl) | M.P. 151–154° C. |
| (20) | R = —⌬—Cl | M.P. 89–90° C. |
| (21) | R = —⌬—Cl | M.P. 131–134° C. |
| (22) | R = —⌬—Cl | M.P. 148–151° C. |
| (23) | R = —⌬ | M.P. 149–151° C. |
| (24) | R = —⌬—CF₃ | M.P. 130–132° C. |
| (25) | R = —C₂H₅ | M.P. 124–126° C. |
| (26) | R = —CH₂CH₂Cl | M.P. 113–115° C. |
| (27) | R = —⌬(CH₃)(NO₂) | M.P. 125–128° C. |
| (28) | R = —⌬(Cl)(Cl)(Cl) | M.P. 125° C. |
| (29) | R = —⌬(Br) | M.P. 134–137° C. |
| (30) | R = —⌬(Cl)(NO₂) | M.P. 136–138° C. |
| (31) | R = —⌬(Cl)(CF₃) | M.P. 124–126° C. |
| (32) | R = —⌬—CH₃ | M.P. 103–104° C. |
| (33) | R = —⌬(CH₃)(CH₃) | M.P. 136–138° C. |
| (34) | R = —⌬(I)(NO₂) | M.P. 71–73° C. |
| (35) | R = —⌬(Cl)(CH₃) | M.P. 123° C. |

(36) 8-quinolyl N-methylcarbamate, 5-Cl substituent — M.P. 145–147° C.

(37) 2-iodo-5-chloro-8-quinolyl N-methylcarbamate — M.P. 172–174° C.

(38) 8-quinolyl N,N-dimethylcarbamate — M.P. 74–78° C.

(39) 2-methyl-8-quinolyl N,N-dimethylcarbamate — M.P. 76–77° C.

Salts:

Structure: 2-methyl-8-quinolyl N-methylcarbamate · X

| | | |
|---|---|---|
| (40) | X = HCl | M.P. 143–144° C. |
| (41) | H₃BO₄ | M.P. 151–153° C. |
| (42) | H₂SO₄ | M.P. 142–144° C. |
| (43) | HIO₃ | M.P. 132° C. |
| (44) | HNO₃ | M.P. 150–152° C. |
| (45) | H₃AsO₄ | M.P. 200–207° C. |
| (46) | H₃C—⌬—SO₃H | M.P. 155–157° C. |
| (47) | (naphthyl)—SO₃H | M.P. 110–117° C. |
| (48) | CH₃SO₃H | M.P. 147–148° C. |

EXAMPLE 2

(a) A spray powder of the following composition was prepared:

50% of one of the compounds of Example 1
40% of bolus alba (kaolin)

5% of finely divided silica (product marketed under the trade name HISIL)
3.5% of a condensation product from 1 mol of paratertiary octylphenol with 9 mols of ethylene oxide
1.5% of sodium 1-benzyl-2-stearyl-benzimidazole-6,3'-disulphonate.

The resulting, finely ground mixture can be diluted with water to form a spray broth ready for use.

(b) In each test 10 parts of one of the compounds of Example 1 were mixed with 30 parts of dimethylformamide and 15 parts of an emulsifier (Toximal Q; makers—Ninol Corp., Chicago) consisting of a mixture of a nonionic and an anionic surface-active substance, and each mixture was made up to 100 cc. with xylene. The resulting clear solution was used as a spray broth concentrate which could be emulsified by pouring it into water.

(c) 1 part of one of the compounds of Example 1 was dissolved in a small quantity of acetone, sprayed over 99 parts of kaolin and the whole was ground to form a homogeneous casting powder.

(d) By virtue of their solubility in water the salts may be used as they are or in admixture with a surface-active substance.

EXAMPLE 3

A casting bait of the following composition was prepared:
1.45% of one of the compounds Nos. 2 or 40 to 48 in Example 1
0.025% of lamp black
0.1% of bitters (sucrose-octaacetate)
2% of white petroleum jelly and
96.425% of sugar.

The resulting, ground mixture is excellently suitable for use as a casting bait for flies and other insects.

EXAMPLE 4

(a) Antibacterial activity 20 mg. of active substance are dissolved in 10 ml. of propyleneglycol, and 0.25 ml. of this solution are added to 4.75 ml. of a sterile glucose broth and diluted in steps of 10.

Each dilution was inoculated with *Staphylococcus aureus* or, respectively, with *Escherichia coli*, and incubated for 48 hours at 37° C. (bacteriostatic test). After allowing the cultures to grow for 24 hours, the quantity of each retained by a wire loop was smeared over glucose agar plates and incubated for 24 hours at 37° C. (bactericidal test). Table 1 shows the minimum inhibitory concentrations in parts per million:

TABLE 1

| Active substance | Staph. aureus | Escherichia coli |
|---|---|---|
| | Bacteriostatic/bactericidal effect | |
| Quinolyl-N-3,4-dichlorophenylcarbamate | 1/1 | 100/100 |

Similarly good effects were obtained with the following compounds:

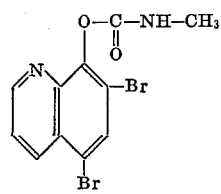

Quinolyl-N-3-chlorophenylcarbamate
Quinolyl-N-4-chlorophenylcarbamate
Quinolyl-N-phenylcarbamate
Quinolyl-N-3-trifluoromethylphenylcarbamate
Quinolyl-N-methylcarbamate
Quinolyl-N-ethylcarbamate
Quinolyl-N-chloroethylcarbamate
Quinolyl-N-4-nitrophenylcarbamate
Quinolyl-N-3-bromophenylcarbamate
Quinolyl-N-n-propylcarbamate
Quinolyl-N-2-chlorophenylcarbamate
Quinolyl-N-3-nitro-4-methylphenylcarbamate
Quinolyl-N-2,4,5-trichlorophenylcarbamate
Quinolyl-N-4-chlor-3-trifluoromethylphenylcarbamate
Quinaldyl-N-3,4-dichlorophenylcarbamate
Quinaldyl-N-3-chlorophenylcarbamate
Quinaldyl-N-4-chlorophenylcarbamate
Quinaldyl-N-3-trifluoromethylphenylcarbamate (b) Antimycotic activity The determination of the fungistatic effect is carried out in small tubes containing sterile beer wort solution (10%) in descending concentrations. The contents of each tube were inoculated with *Aspergillus niger* or, respectively, *Rhizopus nigricans*, then incubated for 72 hours at 25° C. and the minimum inhibitory concentration (in parts per million) of the fungistase was recorded.

The determination of the effect against *Trichophyton interdigitale* was carried out by an agar diffusion test. The figures in the following table are the inhibitory zones in mm.

| Active substance | Asper. niger fungistat. effect | Rhiz. nigr. fungistat. effect | Trich. inter-dig. inh. zone |
|---|---|---|---|
| Quinolyl-N-3,4-dichlorophenyl-carbamate | 60 | 30 | |
| Quinolyl-N-4-chlorophenyl-carbamate | 100 | 100 | 10 |
| Quinolyl-N-phenylcarbamate | 50 | 100 | |
| Quinolyl-N-3-trifluoromethyl-phenyl-carbamate | 30 | 30 | |
| Quinolyl-N-2-chlorophenyl-carbamate | 60 | 30 | |
| Quinaldyl-N-3,4-dichlorophenyl-carbamate | 30 | 30 | 10 |
| Quinaldyl-N-2-chlorophenyl-carbamate | 30 | 30 | |
| Quinaldyl-N-4-chlorophenyl-carbamate | 60 | 30 | |

The other compounds listed in Table 1 displayed a similarly good activity.

The compounds Nos. 10 and 11 of Example 1 displayed a good microbicidal effect against phytopathogenic fungi, for example at a concentration of 0.2% of active substance (Example 1, No. 10) a 95% effect against *Alternaria solani* on tomatoes, and at a concentration of 0.2% of active substance (Example 1, No. 11) a 100% effect against *Septoria apii* on celery was recorded without the plants treated themselves suffering any appreciable damage (c) Activity against protozoa The compound No. 9 of Example 1, at a concentration of 10 parts per million, still displayed its full activity against *Entamoeba histolytica*.

(d) Insecticidal activity

The compounds Nos. 1, 2, 28 and 29 of Example 1 displayed in a concentration of 0.08% of active substance against the leaf beetle, *Gastroidea viridula*, and against *Orgyia gonostigma* (Lepidoptera) after 5 days a 100% killing effect.

When the compounds Nos. 2 and 40 to 48 of Example 1 were applied in the form of a dusting preparation of 1% strength (manufactured as described in Example 2(c)) they displayed a 100% killing effect against the German, American and Russian cockroaches (*Phylodromia germanica, Periplaneta americana, Blatta orientalis*) after 1 hour.

An equal effect was also achieved against cockroaches resistant towards diazinon and malathion.

Against *Locusta magratoria* the compounds Nos. 2 and 40 to 48 of Example 1 displayed after 24 hours a 100% killing effect in a concentration of 0.005% of active substance.

(e) Nematocidal activity 2 grams of the compound No. 1 or 2 of Example 1 are dissolved in 50 g. of acetone and with addition of an emulsifier soluble in acetone diluted with water to the desired concentration. The resulting preparation acts as a nematocide. Panegrellus redivivus in washed quartz sand is treated with solutions of the active substance mentioned in concentrations of 25, 50 and 100 parts per million respectively. After 48 hours the following mortal effects of the active substances mentioned were recorded:

|   | 25 parts per million, percent | 50 parts per million, percent | 100 parts per million, percent |
|---|---|---|---|
| No. 1 |  | 50 | 81 |
| No. 2 |  | 50 |  | 96 |

What is claimed is:
1. A member selected from the group consisting of (a) the compound of the formula

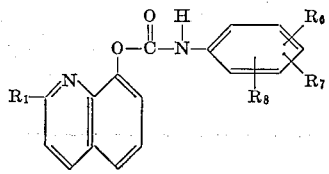

wherein $R_1$ is hydrogen or methyl, $R_6$ is methyl, $-NO_2$, $-CF_3$ or halogen, $R_7$ is hydrogen, methyl or halogen, and $R_8$ is hydrogen or halogen, and (b) a salt selected from the group consisting of the sulfate, iodate, hydrochloride, phosphate and nitrate of said compound.

2. The salt of the compound according to claim 2 with a sulfonic acid of the formula

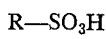

wherein R is methyl, p-methylphenyl or naphthyl.

3. The compound according to claim 1 of the formula

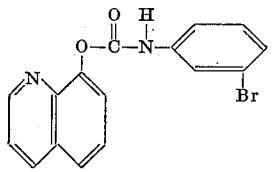

4. The compound according to claim 1 of the formula

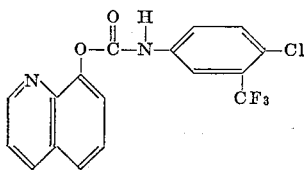

5. The compound according to claim 1 of the formula

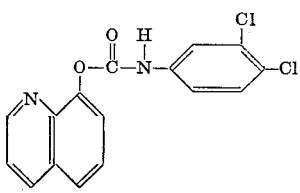

6. The cmpound according to claim 1 of the formula

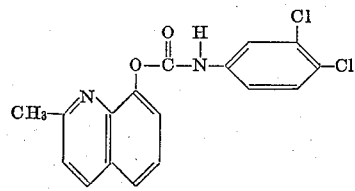

7. The compound according to claim 1 of the formula

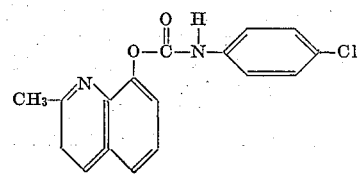

8. The compound according to claim 1 of the formula

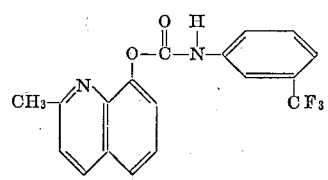

References Cited
UNITED STATES PATENTS

| 2,603,662 | 7/1952 | Stevens | 260—624 |
| 3,125,598 | 3/1964 | Kühle et al. |  |
| 3,362,960 | 1/1968 | Hopel. |  |
| 3,384,538 | 5/1968 | Hopel. |  |
| 3,391,176 | 7/1968 | Goldberg | 260—287 |
| 3,393,224 | 7/1968 | Brookes et al. | 260—287 X |

OTHER REFERENCES

Netherlands, 6603294, September 1966 to Bayer, abstracted in Chem. Abstr., vol. 66, Col. 55,410b (1967).

Japan, 21,616, December 1966 to Yoshitomi Pharm. Ind. in Chem. Abstr., vol. 66, Col. 55,409h (1967).

Netherlands, 6606695, November 1966 to Ciba, abstracted in Chem. Abstr., vol. 7, Col. 21,843a (1967).

DONALD G. DAUS, Primary Examiner

U.S. Cl. X.R.

71—94; 252—106; 260—286, 289, 290, 316.1, 453; 424—258, 232

CASE 5693/E/Cont.

PO-1050
(5/69)

UNITED STATES PATENT OFFICE
CERTIFICATE OF CORRECTION

Patent No. 3,538,099    Dated November 3, 1970

Inventor(s) Otto Rohr et al

It is certified that error appears in the above-identified patent and that said Letters Patent are hereby corrected as shown below:

Claim 6, line 1, "cmpound" should read --- compound ---; the right-hand portion of the formula should read ---

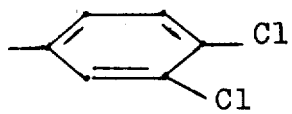

---.

Signed and sealed this 6th day of July 1971.

(SEAL)
Attest:

EDWARD M. FLETCHER, JR.
Attesting Officer

WILLIAM E. SCHUYLER, JR.
Commissioner of Patents